(12) United States Patent
Li et al.

(10) Patent No.: US 9,294,764 B2
(45) Date of Patent: Mar. 22, 2016

(54) VIDEO ENCODER WITH INTRA-PREDICTION CANDIDATE SCREENING AND METHODS FOR USE THEREWITH

(71) Applicant: ViXS Systems, Inc., Toronto (CA)

(72) Inventors: Ying Li, Richmond Hill (CA); Xu Gang Zhao, Maple (CA)

(73) Assignee: ViXS Systems, Inc., Toronto (CA)

( * ) Notice: Subject to any disclaimer, the term of this patent is extended or adjusted under 35 U.S.C. 154(b) by 214 days.

(21) Appl. No.: 14/159,805

(22) Filed: Jan. 21, 2014

(65) Prior Publication Data

US 2015/0195519 A1    Jul. 9, 2015

Related U.S. Application Data

(60) Provisional application No. 61/924,453, filed on Jan. 7, 2014.

(51) Int. Cl.
| | |
|---|---|
| H04N 19/42 | (2014.01) |
| H04N 19/139 | (2014.01) |
| H04N 19/11 | (2014.01) |
| H04N 19/176 | (2014.01) |
| H04N 19/136 | (2014.01) |
| H04N 19/147 | (2014.01) |
| H04N 19/51 | (2014.01) |
| H04N 19/196 | (2014.01) |
| H04N 19/105 | (2014.01) |
| H04N 19/14 | (2014.01) |
| H04N 19/172 | (2014.01) |
| H04N 19/182 | (2014.01) |

(52) U.S. Cl.
CPC ... *H04N 19/00042* (2013.01); *H04N 19/00024* (2013.01); *H04N 19/00139* (2013.01); *H04N 19/00157* (2013.01); *H04N 19/00175* (2013.01); *H04N 19/00266* (2013.01); *H04N 19/00278* (2013.01); *H04N 19/00303* (2013.01); *H04N 19/00369* (2013.01); *H04N 19/00696* (2013.01)

(58) Field of Classification Search
None
See application file for complete search history.

(56) References Cited

U.S. PATENT DOCUMENTS

2014/0010293 A1*  1/2014  Srinivasan ....... H04N 19/00763
                                                  375/240.12

* cited by examiner

*Primary Examiner* — Dave Czekaj
*Assistant Examiner* — Nam Pham
(74) *Attorney, Agent, or Firm* — Garlick & Markison; Bruce E. Stuckman

(57) ABSTRACT

An intra-prediction module includes a candidate screening preprocessor configured to process blocks of picture data based on intra-prediction candidate data corresponding to a plurality of pixels of the blocks. The intra-prediction candidate data indicates a first subset selected from a plurality of intra-prediction partitions and a second subset selected from a plurality of intra-prediction modes. The processing includes screening the intra-prediction candidate data to generate screened intra-prediction candidate data that indicates a third subset selected from a plurality of intra-prediction partitions and a fourth subset selected from a plurality of intra-prediction modes. A rate distortion optimization processor determines final intra-prediction data, based on the screened intra-prediction candidate data.

16 Claims, 9 Drawing Sheets

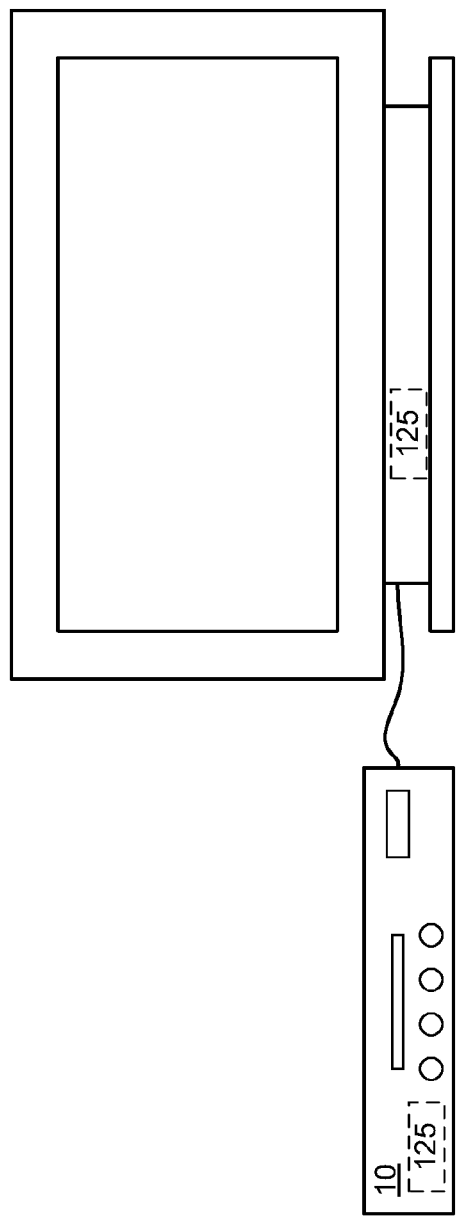
FIG. 1
FIG. 2
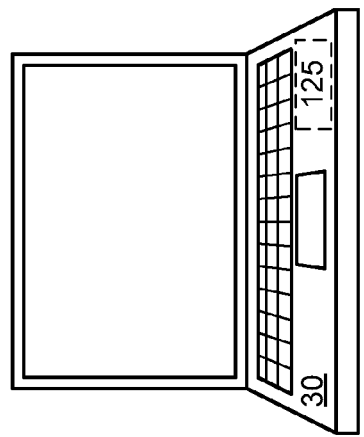
FIG. 3

Video encoding operation

Video decoding operation

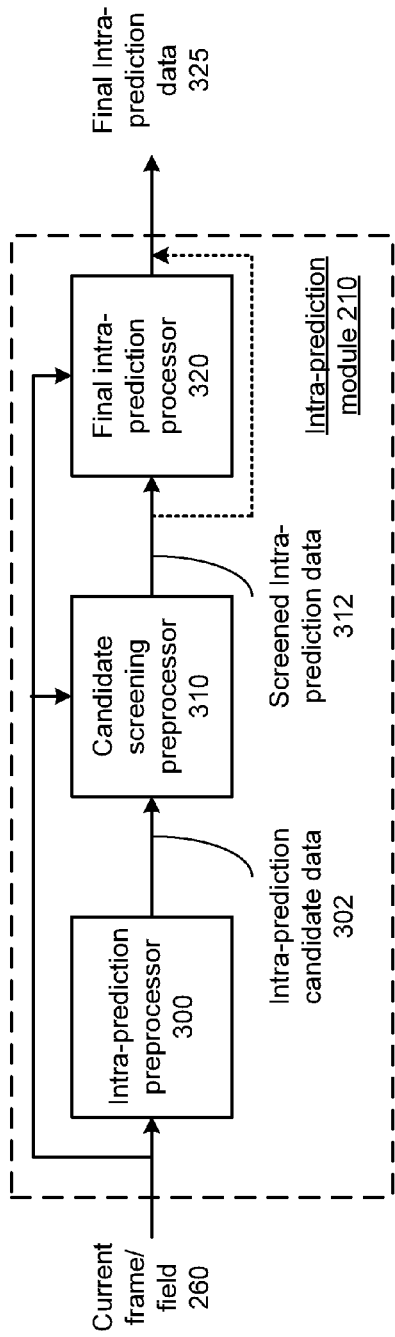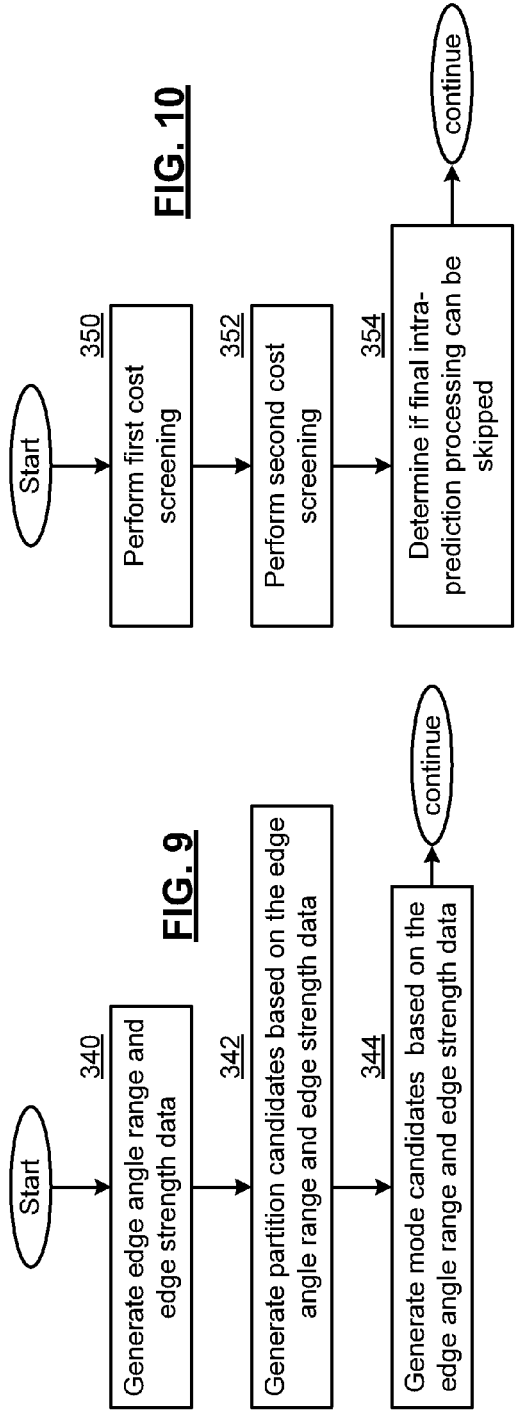

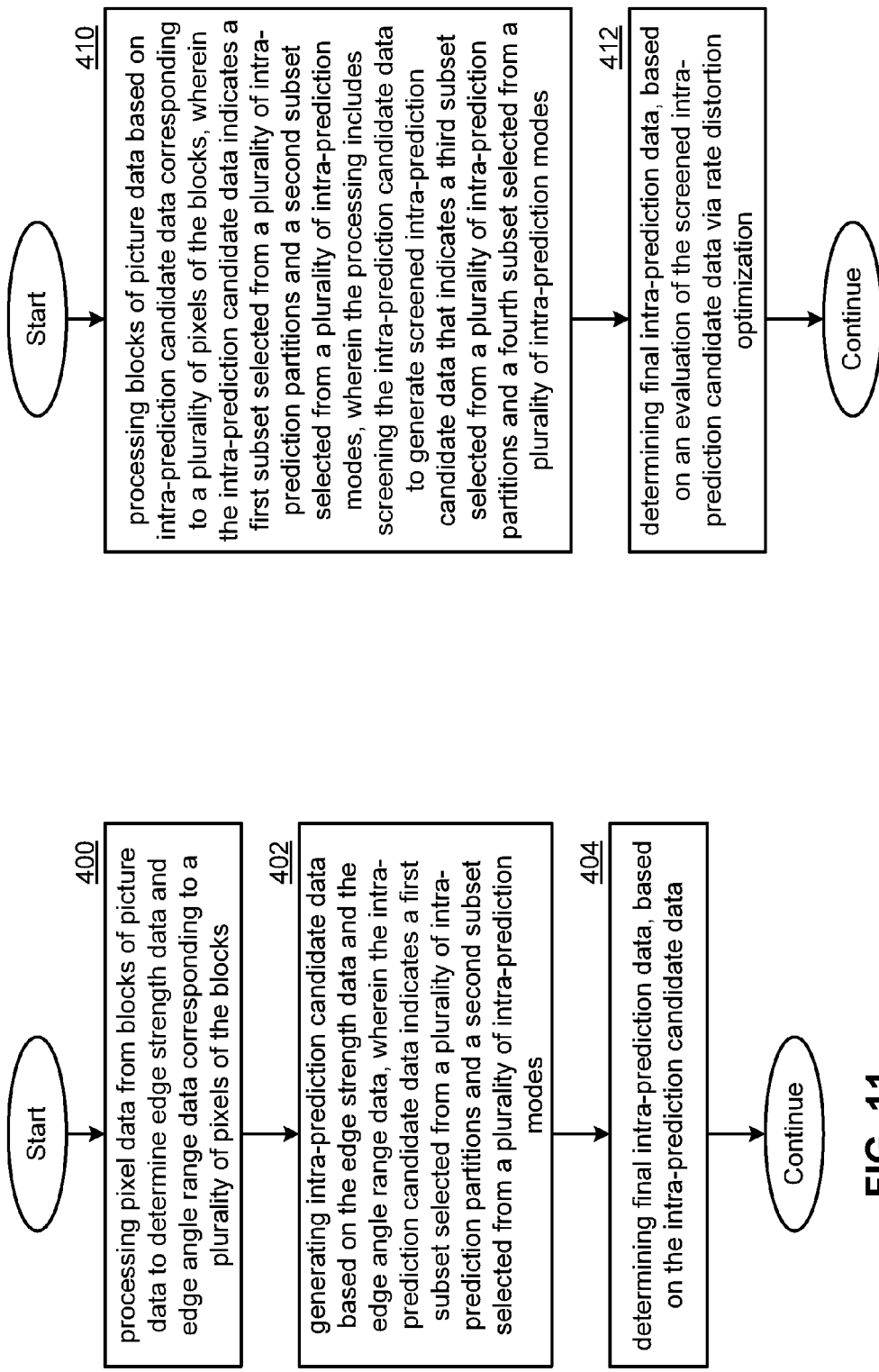

VIDEO ENCODER WITH INTRA-PREDICTION CANDIDATE SCREENING AND METHODS FOR USE THEREWITH

CROSS REFERENCE TO RELATED PATENTS

The present application claims priority under 35 U.S.C. 119(e) to the provisionally filed application entitled, VIDEO ENCODER WITH INTRA-PREDICTION PRE-PROCESSING AND METHODS FOR USE THEREWITH, having application Ser. No. 61/924,453, filed on Jan. 7, 2014, the contents of which are incorporated herein by reference for any and all purposes.

TECHNICAL FIELD

The present disclosure relates to encoding used in devices such as video encoders/decoders.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

Efficient and fast encoding and decoding of video signals is important to the implementation of many video devices, particularly video devices that are destined for home use. Motion estimation can be important to video encoding. Accurate intra-prediction saves bits in encoding and can also be important for encoding quality, especially at high quantization levels.

BRIEF DESCRIPTION OF THE SEVERAL VIEWS OF THE DRAWINGS

FIGS. 1-3 present pictorial diagram representations of various video devices in accordance with embodiments of the present disclosure.

FIG. 8 presents a block diagram representation of an intra-prediction module in accordance with an embodiment of the present disclosure.

FIG. 9 presents a flowchart representation of a method in accordance with an embodiment of the present disclosure.

FIG. 10 presents a flowchart representation of a method in accordance with an embodiment of the present disclosure.

FIG. 11 presents a flowchart representation of a method in accordance with an embodiment of the present disclosure.

FIG. 12 presents a flowchart representation of a method in accordance with an embodiment of the present disclosure.

DETAILED DESCRIPTION

FIGS. 1-3 present pictorial diagram representations of various video devices in accordance with embodiments of the present disclosure. In particular, set top box 10 with built-in digital video recorder functionality or a stand alone digital video recorder, computer 20 and portable computer 30 illustrate electronic devices that incorporate a video device 125 that includes one or more features or functions of the present disclosure. While these particular devices are illustrated, video processing device 125 includes any device that is capable of encoding, decoding and/or transcoding video content in accordance with the methods and systems described in conjunction with FIGS. 4-14 and the appended claims.

Figure 4:
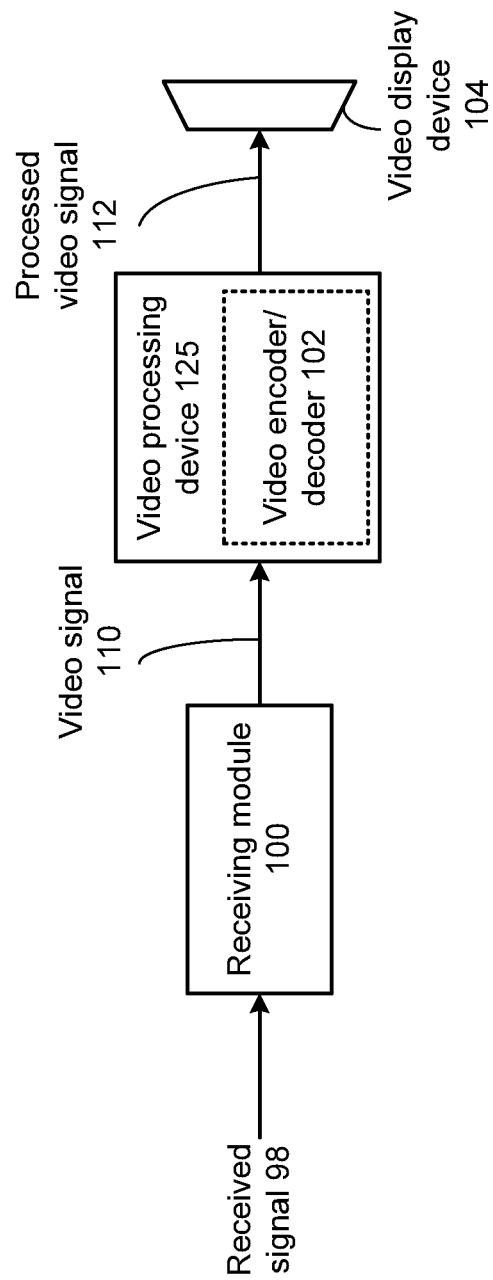
FIG. 4 presents a block diagram representation of a video device in accordance with an embodiment of the present disclosure.

FIG. 4 presents a block diagram representation of a video device in accordance with an embodiment of the present disclosure. In particular, this video device includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video processing device 125 includes video encoder/decoder 102 and is coupled to the receiving module 100 to encode, decode or transcode the video signal for storage, editing, and/or playback in a format corresponding to video display device 104.

In an embodiment of the present disclosure, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can include a digital video signal complying with a digital video codec standard such as H.264, MPEG-4 Part 10 Advanced Video Coding (AVC) or another digital format such as a Motion Picture Experts Group (MPEG) format (such as MPEG1, MPEG2 or MPEG4), QuickTime format, Real Media format, Windows Media Video (WMV) or Audio Video Interleave (AVI), etc.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Figure 5:
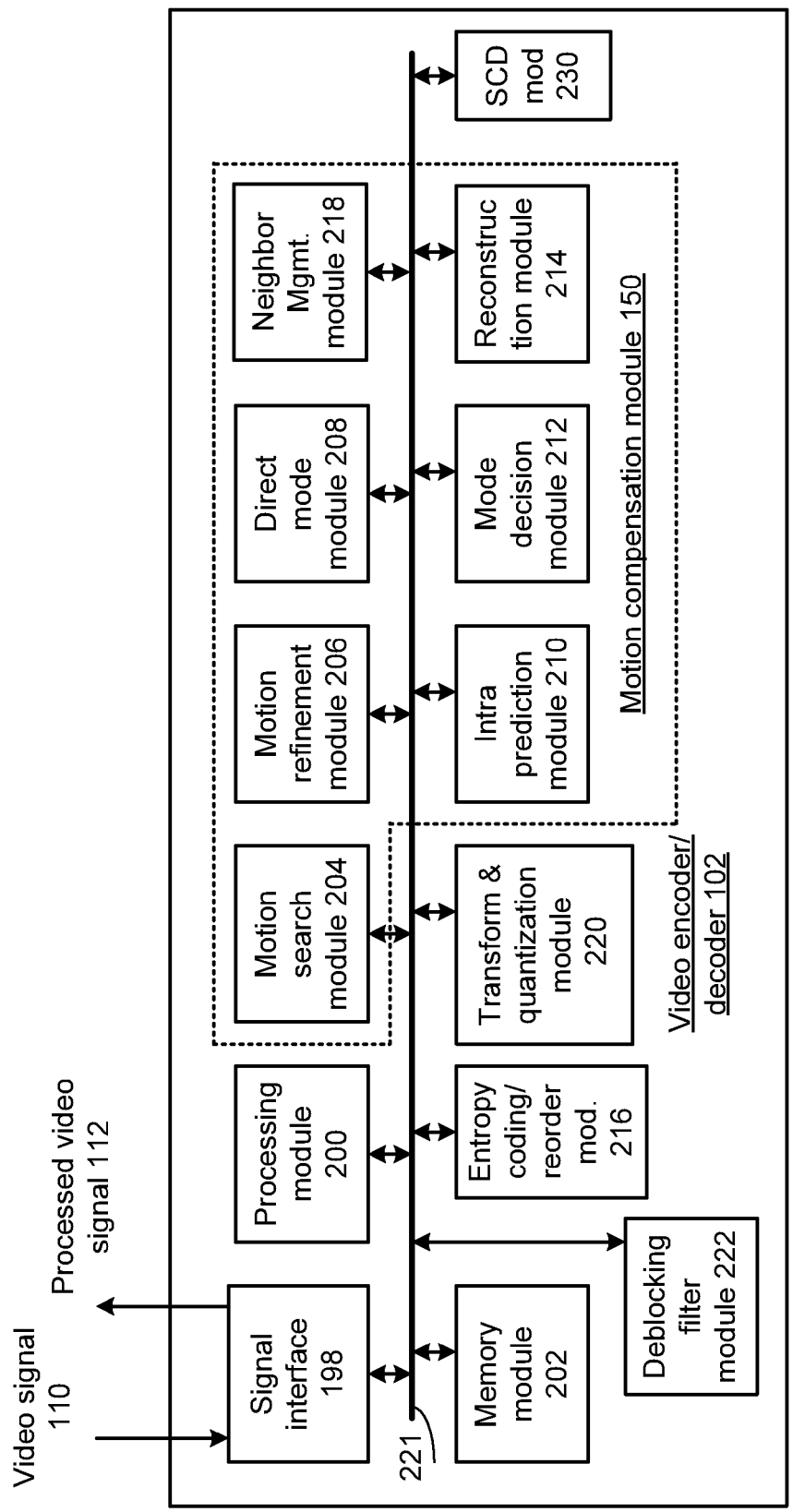
FIG. 5 presents a block diagram representation of a video encoder/decoder in accordance with an embodiment of the present disclosure.

FIG. 5 presents a block diagram representation of a video encoder/decoder in accordance with an embodiment of the present disclosure. In particular, video encoder/decoder 102 can be a video codec that operates in accordance with many of the functions and features of the High Efficiency Video Coding standard (HEVC), H.264 standard, the MPEG-4 standard, VC-1 (SMPTE standard 421M) or other standard, to generate processed video signal 112 by encoding, decoding or transcoding video signal 110. Video signal 110 is optionally formatted by signal interface 198 for encoding, decoding or transcoding.

The video encoder/decoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 221, to the signal interface 198 and a plurality of other modules, such as motion search module 204, motion refinement module 206, direct mode module 208, intra-prediction module 210, mode decision module 212, reconstruction module 214, entropy coding/reorder module 216, neighbor management module 218, forward transform and quantization module 220, deblocking filter module 222, and scene detection module 230. In an embodiment of the present disclosure, the modules of video encoder/decoder 102 can be implemented via an XCODE processing device sold by VIXS Systems, Inc. along with software or firmware. Alternatively, one or more of these modules can be implemented using other hardware, such as another processor or a hardware engine that includes a state machine, analog circuitry, digital circuitry, and/or logic circuitry, and that operates either independently or under the control and/or direction of processing module 200 or one or more of the other modules, depending on the particular implementation. It should also be noted that the software implementations of the present disclosure can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present disclosure.

Video encoder/decoder 102 can operate in various modes of operation that include an encoding mode and a decoding mode that is set by the value of a mode selection signal that may be a user defined parameter, user input, register value, memory value or other signal. In addition, in video encoder/decoder 102, the particular standard used by the encoding or decoding mode to encode or decode the input signal can be determined by a standard selection signal that also may be a user defined parameter, user input, register value, memory value or other signal. In an embodiment of the present disclosure, the operation of the encoding mode utilizes a plurality of modules that each perform a specific encoding function. The operation of decoding also utilizes at least one of these plurality of modules to perform a similar function in decoding. In this fashion, modules such as the motion refinement module 206 and intra-prediction module 210, can be used in both the encoding and decoding process to save on architectural real estate when video encoder/decoder 102 is implemented on an integrated circuit or to achieve other efficiencies. In addition, some or all of the components of the direct mode module 208, mode decision module 212, reconstruction module 214, transformation and quantization module 220, deblocking filter module 222 or other function specific modules can be used in both the encoding and decoding process for similar purposes.

Motion compensation module 150 includes a motion search module 204 that processes pictures from the video signal 110 based on a segmentation into macroblocks of pixel values, such as of 64 pixels by 64 pixels, 32 pixels by 32 pixels, 16 pixels by 16 pixels or some other size, from the columns and rows of a frame and/or field of the video signal 110. In an embodiment of the present disclosure, the motion search module determines, for each macroblock or macroblock pair of a field and/or frame of the video signal, one or more motion vectors that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

While motion search module 204 has been described above in conjunction with full resolution search, motion search module 204 can operate to determine candidate motion search motion vectors partly based on scaled or reduced resolution pictures. In particular, motion search module 204 can operate by downscaling incoming pictures and reference pictures to generate a plurality of downscaled pictures. The motion search module 204 then generate a plurality of motion vector candidates at a downscaled resolution, based on the downscaled pictures. The motion search module 204 operates on full-scale pictures to generate motion search motion vectors at full resolution, based on the motion vector candidates. In another embodiment, the motion search module 204 can generate motion search motion vectors for later refinement by motion refinement module 206, based entirely on pictures at downscaled resolution.

Motion estimation can be important to video encoding. Accurate motion estimation saves bits in encoding and can also be important for encoding quality, especially at high quantization levels. On many video streams, there are regions with little details. When smaller block size is used for motion estimation, there are lots of similar local cost minima. If bigger block size is used, search results of bigger regions covered by blocks containing different motion may be wrong.

In an embodiment of the present disclosure, the motion search module 204 determines a motion search motion vector for a region of a selected picture via a dynamic search region and block merging methodology. In particular, the motion search module 204 determines the region by merging selected ones of a plurality of blocks of the selected picture based on an evaluation of a cost matrix associated with the plurality of blocks of the selected picture. This methodology can be efficient when adopted in scaled motion estimation and/or for regions with little details or repeat patterns, especially for HEVC, which supports many options of block partitioning. Further details regarding this process are presented in the co-pending application entitled, VIDEO ENCODER WITH BLOCK MERGING AND METHODS FOR USE THEREWITH, the contents of which are incorporated herein by reference for any and all purposes A motion refinement module 206 generates a refined motion vector for each macroblock of the plurality of macroblocks, based on the motion search motion vector. In an embodiment of the present disclosure, the motion refinement module determines, for each macroblock or macroblock pair of a field and/or frame of the video signal 110, a refined motion vector that represents the displacement of the macroblock from a reference frame or reference field of the video signal to a current frame or field.

Based on the pixels and interpolated pixels, the motion refinement module 206 refines the location of the macroblock in the current frame or field to a greater pixel level accuracy such as to a resolution of ¼-pixel or other sub-pixel resolution. Candidate locations are also evaluated based on a cost formulation to determine the location and refined motion vector that have a most favorable (such as lowest) cost. As in the case with the motion search module, a cost formulation can be based on the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video signal or an estimated predicted motion vector that is determined based on motion vectors from neighboring current macroblocks of a prior row of the video signal. In an embodiment of the present disclosure, the cost calculation avoids the use of neighboring subblocks within the current macroblock. In this fashion, motion refinement module 206 is able to operate on a macroblock to contemporaneously determine the motion search motion vector for each subblock of the macroblock.

When estimated predicted motion vectors are used, the cost formulation avoids the use of motion vectors from the current row and both the motion search module 204 and the motion refinement module 206 can operate in parallel on an entire row of video signal 110, to contemporaneously determine the refined motion vector for each macroblock in the row.

A direct mode module 208 generates a direct mode motion vector for each macroblock, based on macroblocks that neighbor the macroblock. In an embodiment of the present disclosure, the direct mode module 208 operates to determine the direct mode motion vector and the cost associated with the direct mode motion vector based on the cost for candidate direct mode motion vectors for the B slices of video signal 110, such as in a fashion defined by the H.264 or HEVC standard.

While the prior modules have focused on inter-prediction of the motion vector, intra-prediction module 210 generates a best intra prediction mode for each macroblock of the plurality of macroblocks. In an embodiment of the present disclosure, intra-prediction module 210 operates as defined by the HEVC or H.264 standard, however, other intra-prediction techniques can likewise be employed. In particular, intra-prediction module 210 operates to evaluate a plurality of intra prediction modes such as luma prediction modes, chroma prediction or other intra coding, based on motion vectors determined from neighboring macroblocks to determine the best intra prediction mode and the associated cost.

In an embodiment of the present disclosure, the intra-prediction module 210 includes pre-processing to generate intra-prediction candidate data. In a further embodiment, the intra-prediction candidate data is further screened. In particular, the pre-processing and screening attempts to narrow down the possible intra-prediction partitions and intra-prediction modes considered in final processing. Further details including several optional functions and features are described in conjunction with FIGS. 8-12 that follow.

A mode decision module 212 determines a final macroblock cost for each macroblock of the plurality of macroblocks based on costs associated with the refined motion vector, the direct mode motion vector, and the best intra prediction mode, and in particular, the method that yields the most favorable (lowest) cost, or an otherwise acceptable cost. A reconstruction module 214 completes the motion compensation by generating residual luma and/or chroma pixel values for each macroblock of the plurality of macroblocks.

A forward transform and quantization module 220 of video encoder/decoder 102 generates processed video signal 112 by transforming coding and quantizing the residual pixel values into quantized transformed coefficients that can be further coded, such as by entropy coding in entropy coding module 216, filtered by de-blocking filter module 222. In an embodiment of the present disclosure, further formatting and/or buffering can optionally be performed by signal interface 198 and the processed video signal 112 can be represented as being output therefrom.

As discussed above, many of the modules of motion compensation module 150 operate based on motion vectors determined for neighboring macroblocks. Neighbor management module 218 generates and stores neighbor data for at least one macroblock of the plurality of macroblocks for retrieval by at least one of the motion search module 204, the motion refinement module 206, the direct mode module 208, intra-prediction module 210, entropy coding module 216 and deblocking filter module 222, when operating on at least one neighboring macroblock of the plurality of macroblocks. In an embodiment of the present disclosure, a data structure, such as a linked list, array or one or more registers are used to associate and store neighbor data for each macroblock in a buffer, cache, shared memory or other memory structure. Neighbor data includes motion vectors, reference indices, quantization parameters, coded-block patterns, macroblock types, intra/inter prediction module types, neighboring pixel values and or other data from neighboring macroblocks and/or subblocks used by one or more of the modules or procedures of the present disclosure to calculate results for a current macroblock. For example, in order to determine the predicated motion vector for the motion search module 204 and motion refinement module 206, both the motion vectors and reference index of neighbors are required. In addition to this data, the direct mode module 208 requires the motion vectors of the co-located macroblock of previous reference pictures. The deblocking filter module 222 operates according to a set of filtering strengths determined by using the neighbors' motion vectors, quantization parameters, reference index, and codedblock-patterns, etc. For entropy coding in entropy coding module 216, the motion vector differences (MVD), macroblock types, quantization parameter delta, inter predication type, etc. are required.

Consider the example where a particular macroblock MB(x,y) requires neighbor data from macroblocks MB(x−1, y−1), MB(x, y−1), MB (x+1,y−1) and MB(x−1,y). In prior art codecs, the preparation of the neighbor data needs to calculate the location of the relevant neighbor sub-blocks. However, the calculation is not as straightforward as it was in conventional video coding standards. For example, in H.264 coding, the support of multiple partition types make the size and shape for the subblocks vary significantly. Furthermore, the support of the macroblock adaptive frame and field (MBAFF) coding allows the macroblocks to be either in frame or in field mode. For each mode, one neighbor derivation method is defined in H.264. So the calculation needs to consider each mode accordingly. In addition, in order to get all of the neighbor data required, the derivation needs to be invoked four times since there are four neighbors involved—MB(x−1, y−1), MB(x, y−1), MB(x+1, y−1), and MB(x−1, y). So the encoding of the current macroblock MB(x, y) cannot start not until the location of the four neighbors has been determined and their data have been fetched from memory.

In an embodiment of the present disclosure, when each macroblock is processed and final motion vectors and encoded data are determined, neighbor data is stored in data structures for each neighboring macroblock that will need this data. Since the neighbor data is prepared in advance, the current macroblock MB(x,y) can start right away when it is ready to be processed. The burden of pinpointing neighbors is virtually re-allocated to its preceding macroblocks. The encoding of macroblocks can therefore be more streamlined and faster. For example, when the final motion vectors are determined for MB(x−1,y−1), neighbor data is stored for each neighboring macroblock that is yet to be processed, including MB(x,y) and also other neighboring macroblocks such as MB(x, y−1), MB(x−2,y) MB(x−1,y). Similarly, when the final motion vectors are determined for MB(x,y−1), MB(x+1,y−1) and MB(x−1,y) neighbor data is stored for each neighboring macroblock corresponding to each of these macroblocks that are yet to be processed, including MB(x,y). In this fashion, when MB(x,y) is ready to be processed, the neighbor data is already stored in a data structure that corresponds to this macroblock for fast retrieval.

The motion compensation can then proceed using the retrieved data. In particular, the motion search module 204 and/or the motion refinement module 206, can generate at least one predicted motion vector (such as a standard PMV or estimated predicted motion vector) for each macroblock of the plurality of macroblocks using retrieved neighbor data. Further, the direct mode module 208 can generate at least one direct mode motion vector for each macroblock of the plurality of macroblocks using retrieved neighbor data and the intra-prediction module 210 can generate the best intra prediction mode for each macroblock of the plurality of macroblocks using retrieved neighbor data, and the coding module 216 can use retrieved neighbor data in entropy coding, each as set forth in the HEVC standard, H.264 standard, the MPEG-4 standard, VC-1 (SMPTE standard 421M) or by other standard or other means.

Scene detection module 230 detects scene changes in the video signal 110 based, for example on motion detection in the video signal 110. In an embodiment of the present disclosure, scene detection module 230 generates a motion identification signal for each picture video signal 110. The motion in each picture, such as a video field (or frame if it is progressive-scan video source), can be represented by a parameter called Global Motion (GM). The value of GM quantifies the change of the field compared to the previous same-parity field. In terms of each macroblock pair, the top field is compared to the top field, bottom field compared to bottom field, etc. The value of GM can be computed as the sum of Pixel Motion (PM) over all pixels in the field or frame, where the value of PM is calculated for each pixel in the field or frame.

The parameter GM, can be used to detect a scene change in the video signal 110. When the scene change happens on a field, the field will generate considerably higher GM value compared to "normal" fields. A scene change can be detected by analyzing the GM pattern along consecutive fields, for example by detecting an increase or decrease in GM in consecutive fields that exceeds a scene detection threshold. Once a scene change is detected that corresponds to a particular image, encoding parameters of encoder/decoder 102 can be adjusted to achieve better results. For example, the detection of a scene change can be used to trigger the start of a new group of pictures (GOP). In another example, the encoder/decoder 102 responds to a scene change detection by adjusting the values of QP to compensate for the scene change, by enabling or disabling video filters or by adjusting or adapting other parameters of the encoding, decoding, transcoding or other processing by encoder/decoder 102.

While not expressly shown, video encoder/decoder 102 can include a memory cache, shared memory, a memory management module, a comb filter or other video filter, and/or other module to support the encoding of video signal 110 into processed video signal 112.

Further details of general encoding and decoding processes will be described in greater detail in conjunction with FIGS. 6 and 7.

Figure 6:
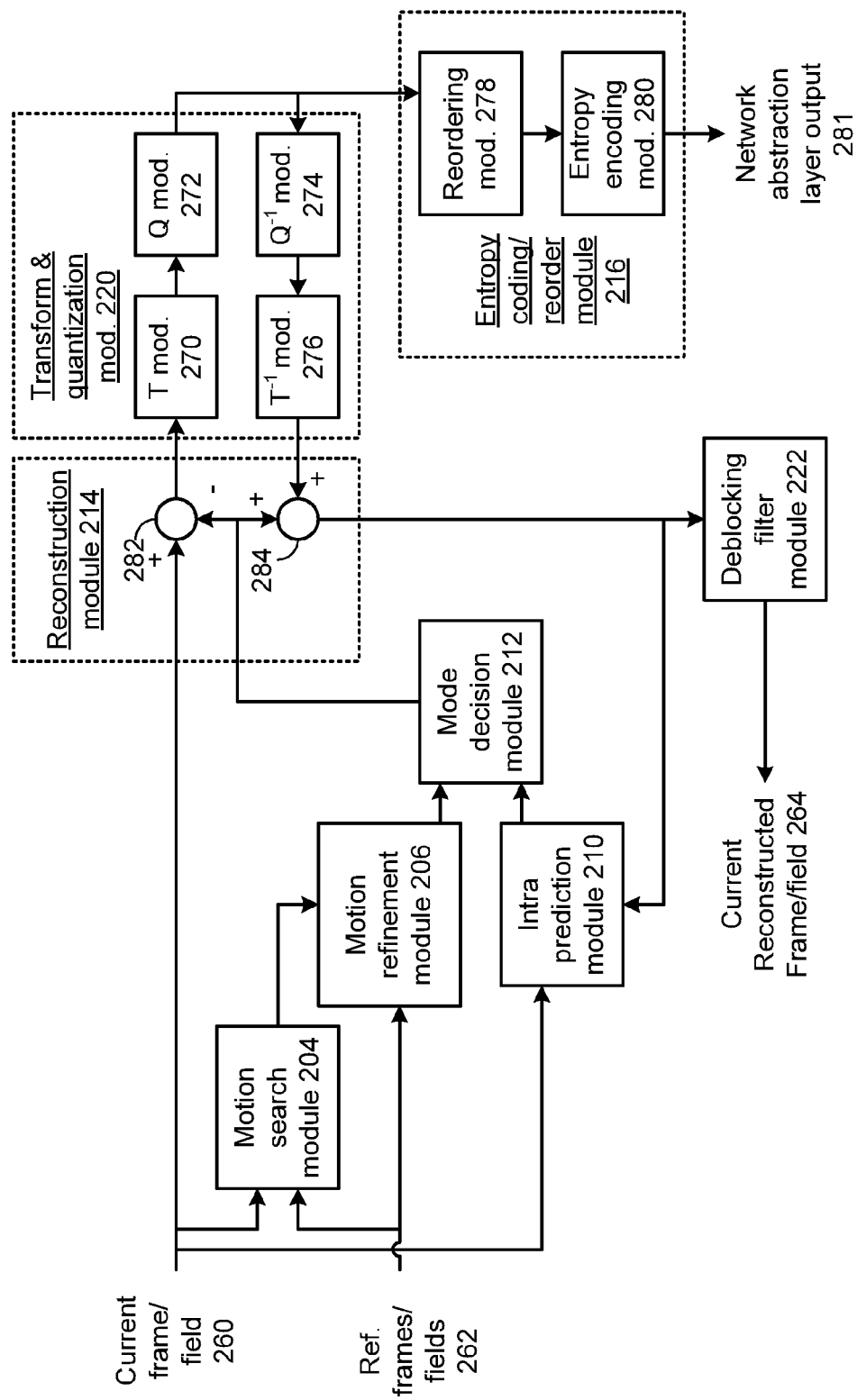
FIG. 6 presents a block flow diagram of a video encoding operation in accordance with an embodiment of the present disclosure.

FIG. 6 presents a block flow diagram of a video encoding operation in accordance with an embodiment of the present disclosure. In particular, an example video encoding operation is shown that uses many of the function specific modules described in conjunction with FIG. 5 to implement a similar encoding operation. Motion search module 204 generates a motion search motion vector for each macroblock of a plurality of macroblocks based on a current frame/field 260 and one or more reference frames/fields 262. Motion refinement module 206 generates a refined motion vector for each macroblock of the plurality of macroblocks, based on the motion search motion vector. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual pixel values corresponding to the final motion vector for each macroblock of the plurality of macroblocks by subtraction from the pixel values of the current frame/field 260 by difference circuit 282 and generates unfiltered reconstructed frames/fields by re-adding residual pixel values (processed through transform and quantization module 220) using adding circuit 284. The transform and quantization module 220 transforms and quantizes the residual pixel values in transform module 270 and quantization module 272 and re-forms residual pixel values by inverse transforming and dequantization in inverse transform module 276 and dequantization module 274. In addition, the quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed frames/fields 264 from the unfiltered reconstructed frames/fields. It should also be noted that current reconstructed frames/fields 264 can be buffered to generate reference frames/fields 262 for future current frames/fields 260.

As discussed in conjunction with FIG. 5, one or more of the modules of video encoder/decoder 102 can also be used in the decoding process as will be described further in conjunction with FIG. 7.

Figure 7:
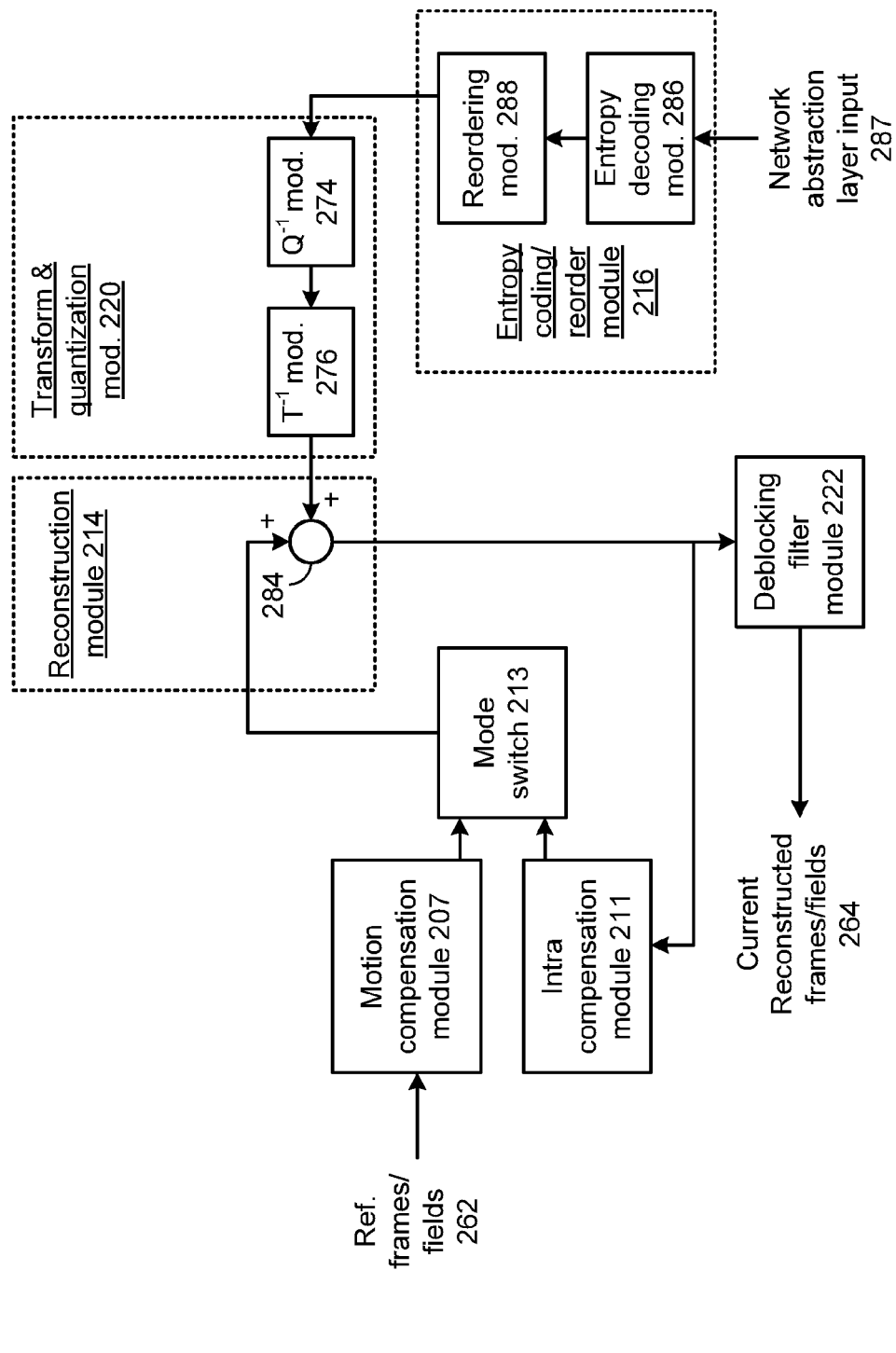
FIG. 7 presents a block flow diagram of a video decoding operation in accordance with an embodiment of the present disclosure.

FIG. 7 presents a block flow diagram of a video decoding operation in accordance with an embodiment of the present disclosure. In particular, this video decoding operation contains many common elements described in conjunction with FIG. 6 that are referred to by common reference numerals. In this case, the motion compensation module 207, the intra-compensation module 211, the mode switch 213, process reference frames/fields 262 to generate current reconstructed frames/fields 264. In addition, the reconstruction module 214 reuses the adding circuit 284 and the transform and quantization module reuses the inverse transform module 276 and the inverse quantization module 274. It should be noted that while entropy coding/reorder module 216 is reused, instead of reordering module 278 and entropy encoding module 280 producing the network abstraction layer output 281, network abstraction layer input 287 is processed by entropy decoding module 286 and reordering module 288.

While the reuse of modules, such as particular function specific hardware engines, has been described in conjunction with the specific encoding and decoding operations of FIGS. 6 and 7, the present disclosure can likewise be similarly employed to the other embodiments of the present disclosure described in conjunction with FIGS. 1-5 and 8-14 and/or with other function specific modules used in conjunction with video encoding and decoding.

FIG. 8 presents a block diagram representation of an intra-prediction module in accordance with an embodiment of the present disclosure. An intra-prediction module 210 is presented that includes intra-prediction preprocessor 300, candidate screening preprocessor 310, and final intra-prediction processor 320. In particular, intra-prediction preprocessor 300 generates intra-prediction candidate data 302 from input pictures in the form of current frame/field data 260. The intra-prediction candidate data 302 is further screened by candidate screening pre-processor 310 to generate screened intra-prediction data 312. The final intra-prediction processor 320 operates based on the screened intra-prediction data 312 to generate final intra-prediction data 325. The intra-prediction preprocessor 300, candidate screening preprocessor 310, and final intra-prediction processor 320 can be implemented via a single processing device such as a dedicated or shared processing device or via one or more separate processing devices.

Consider an example where the intra-prediction module 210 operates in accordance with the HEVC standard to generate final intra-prediction data 325. Block sizes of 4×4, 8×8, 16×16, 32×32 and 64×64 can be considered in conjunction with associated partitions. In each case, as many as 33 different directional modes are evaluated as well as planar and DC modes. The processing performed by final intra-prediction processor 320 can include a rate distortion optimization. While this processing can yield accurate intra-predictions, it comes at the cost of high computational complexity. Rate distortion optimization for each block size/partition and mode can place a burden on the intra-prediction module 210. In operation, the pre-processing and candidate screening performed by the intra-prediction preprocessor 300 and the candidate screen preprocessor 310 attempts to narrow down the possible intra-prediction partitions and intra-prediction modes considered in final processing by final intra-prediction processor 320. In this fashion, unlikely candidates are eliminated by less rigorous techniques. A more limited set of candidates is subjected to the more rigorous final processing. Further, when candidate identification and screening yields a clearly dominant candidate, final intra-prediction preprocessing can be skipped/bypassed altogether.

In an embodiment, the intra-prediction preprocessor 300 is configured to evaluate a plurality of prediction block sizes. Pixel data from the picture data, such as current frame/field 260, are processed via an edge operator or other edge-based processing to determine edge strength data and edge angle range data corresponding to a plurality of pixels of these blocks. The intra-prediction preprocessor 300 generates intra-prediction candidate data 302 based on the edge strength data and the edge angle range data. In particular, the intra-prediction candidate data 302 indicates a partition subset selected from the plurality of all possible intra-prediction partitions and a mode subset selected from the plurality of all possible intra-prediction modes.

In one mode of operation, the edge angle range data provides an index to one of a discrete set of possible directions. The edge strength data and the edge angle range data correspond to a picture gradient for each of the plurality of pixels. The edge strength data can indicate the magnitude of the gradient while the edge angle range data can indicate a range of angles, i.e. an approximate direction or direction range for the gradient. The intra-prediction preprocessor 300 selects the partition subset from the possible partitions based on an accumulation of the edge strength data for each pixel having a common one of a plurality of possible edge angle range values. In this fashion, one or more dominant edge angle ranges can be identified for these pixel gradients along with a corresponding strength for each direction.

In an embodiment, the intra-prediction preprocessor 300 determines whether to include or exclude candidate partitions and corresponding block sizes. For example, the intra-prediction preprocessor 300 determines, for a particular block size, an edge angle range value of the plurality of edge angle range values having a second highest accumulation of edge strength data, compares the second highest accumulation of edge strength data to a threshold and excludes partitions of the particular block size from the partition subset when the second highest accumulation of edge strength data compares favorably to a threshold.

Further, the intra-prediction preprocessor can determine, for a prediction block size and for each partitioned subblock of that prediction block size, an edge angle range value of the plurality of edge angle range values having a highest accumulation of edge strength data, compares the highest accumulation of edge strength data for the block size to the sum of the highest accumulation of edge strength data for each partitioned subblock and includes a partition in the partition subset when the highest accumulation of edge strength data for the full block size compares unfavorably to the sum of the highest accumulation of edge strength data for each partitioned subblock.

In a further mode of operation, the intra-prediction preprocessor 300 selects the mode subset based on an accumulation of edge strength data for each pixel having a common one of a plurality of possible edge angle range values. For example, the intra-prediction preprocessor, for a particular prediction block size, includes in the mode subset those candidate modes corresponding to a particular edge angle range value when the accumulation of edge strength data for the particular edge angle range value compares favorably to a threshold. In this fashion, dominant directions can be included. Further, the intra-prediction preprocessor 300 can exclude modes corresponding to a particular edge angle range value from the second subset when the accumulation of edge strength data for the particular edge angle range value compares unfavorably to a highest accumulation of edge strength data. In this fashion, non-dominant directions can be excluded from the mode candidates.

Considering the example where the intra-prediction module 210 operates in accordance with HEVC, most probable mode indication is supported for up to three modes. In an embodiment, the intra-prediction preprocessor 300 selectively enables and disables a most probable mode indicator that is included in the intra-prediction candidate data 302 for consideration by the candidate screening preprocessor 310 and/or the final intra-prediction processor 320.

Consider the operation of the intra-prediction preprocessor 300 in light of the following further example. The intra-prediction candidate data 302 includes the candidate partitions and candidate modes and an indicator of whether MPM should be enabled or disabled. First, picture gradients on each pixel can be estimated by applying edge detection operators (such as Sobel operator, other edge-based operator or other gradient prediction methodology) on either original input picture represented by current frame/field 260, or on pre-smoothed or down-scaled version of current frame/field 260. In one example, the x and y coordinates of the gradient dx and dy can be determined as:

$$dx=P(x+1,y)-P(x-1,y)$$

$$dy=P(x,y+1)-P(x,y-1)$$

where P(i, j) represents the pixel value at the location (i, j).

Consider further that a 180° range is divided into a number of different directional ranges. For example, the boundaries of the directional ranges can be set with tangent value equal to {infinity, −8, −4, −2, −4/3, −1, −¾, −½, −¼, −⅛, 0, ⅛, ¼, ½, ¾, 1, 4/3, 2, 4, 8, infinity}. A division-free/multiplication-free numerical method can be used to determine corresponding values of the edge angle range and approximate edge strength for each pixel.

The intra-prediction preprocessor 300 iteratively considers different block sizes from the smallest block size to the biggest block size. It accumulates edge strengths corresponding to same edge angle range for all the pixels in each block. In this fashion, each pixel having the same edge angle range has its strength accumulated. Each edge angle range has a corresponding strength accumulation based on which, if any, of the pixels in the block have that edge angle range and the corresponding edge strengths of each pixel with that edge angle range.

In this example, the intra-prediction preprocessor 300 uses seven thresholds to determine the intra-prediction candidate data 302.
1) maxSplitCost: maximum cost to indicate split and modes of four sub-blocks if a block is further partitioned.
2) minSplitCost: minimum cost to indicate split and modes of the four sub-blocks if a block is further partitioned.
3) avgSplitCost: average cost to indicate split and modes of the four sub-blocks if a block is further partitioned.
4) minModeCost: minimum more cost to code modes other than most probably mode (MPM).
5) maxModeCost: maximum more cost to code modes other than MPM.
6) edgeTolerance: when the strength difference between the biggest accumulated strength and the accumulated strengths of other edge angle ranges is less than this threshold, directions corresponding to these other angle ranges should also be mode candidates.
7) LargeDirectionNumber: of the number of included directions meets or exceeds this number, then determine that there is no specific direction for the block.

Each of these thresholds can vary based on the value of QP in use in the encoder/decoder 102. The intra-prediction preprocessor 300 can include a look-up table, state-machine or other device or algorithm that selects the values of each of the thresholds above based on the current value of QP.

For each block with block size from the second smallest size to the biggest size, the prediction block size predetermination method determines partition candidates and corresponding block sizes to be included in the partition subset as follows.
1) If the second biggest accumulated strength is less than minSplitCost, there is no need to include partitions of the block.
2) Else if the sum of the 4 sub-blocks' biggest accumulated strengths is less than the biggest accumulated strength of current block more than maxSplitCost, this block size should be partitioned, and the blocks biggest accumulated strength should be replaced by the sum of 4 sub-blocks' biggest accumulated strengths plus avgSplitCost.
3) Otherwise, both the partition of the block and a non-partition (full block size) should be included as candidates.

For each included block size, the prediction mode predetermination method determines the mode subset as follows:
1) Include all directions corresponding to accumulated strengths bigger than minModeCost including the biggest accumulated strength and other directions with accumulated strength that is lower than the biggest accumulated strength by less than the edgeTolerance.
2) Check the number of included candidates, if more than LargeDirectionNumber directions were included in Step 1, there is no specific direction for the block. Therefore, non-directional mode DC and/or planar should also be included.
3) If the biggest strength is less than maxModeCost, MPM is enabled.

The candidate screening preprocessor 310 is configured to process blocks of picture data corresponding to a plurality of pixels of the blocks—based on the intra-prediction candidate data 302. This processing includes screening the intra-prediction candidate data 302 to generate screened intra-prediction candidate data 312 that indicates screened partition and mode candidates. The screened intra-prediction candidate data 312 includes a partition subset selected from the plurality of all intra-prediction partitions, and a mode subset selected from a plurality of all possible intra-prediction modes and optionally an indication of whether MPM is enabled or disabled. In one mode of operation, the final intra-prediction processor 320 determines final intra-prediction data 325, based on the screened intra-prediction candidate data 312. In other cases, processing by the final intra-prediction processor 320 can be bypassed when the intra-prediction candidate data 312 indicates a single candidate. In these cases, the final intra-prediction data 325 can be selected as simply the single candidate indicated by the intra-prediction candidate data 312.

In an embodiment, the candidate screening preprocessor 310 generates the screened intra-prediction candidate data 312 based on a first cost function and a second cost function. The first cost function and the second cost function can include a sum of absolute differences and a sum of absolute transformed differences, however, other non-rate-distortion based cost functions can also be employed. Further, the candidate screening preprocessor can generate the screened intra-prediction candidate data based on one or more allowed transform sizes and further based on the current value of QP selected in the encoder/decoder 102.

In an embodiment, the candidate screening preprocessor 310 provides more in-depth processing than the intra-prediction preprocessor, but less rigor than the techniques used by the final intra-prediction processor 320. The screening performed by candidate screening preprocessor 310 can narrow down those candidates identified by the intra-prediction preprocessor 300 by further eliminating some of the mode and/or partition candidates for final intra-prediction processing. In addition, to eliminating candidates, the screening can restore certain mode or partition candidates if warranted. For example, the candidate screening preprocessor can evaluate not only the directions identified in the intra-prediction candidate data, but can also evaluate modes with directions adjacent to candidates identified for inclusion by the intra-prediction preprocessor 300.

The operation of the candidate screening preprocessor 310 can be described in light of the following example that builds on an example presented in conjunction with the intra-prediction preprocessor 300. In particular, the candidate screening preprocessor 310 screens and adjusts the mode and partition candidates based on HEVC intra-prediction process and an original block boundary. SAD and SATD dissimilarity measures are used to evaluate candidate intra-prediction partitions and modes from preprocessing. In addition, possible transform sizes are screened based on boundaries of original pixels and texture continuity info.

Step 1:
For each candidate partition from the smallest to the biggest:
   a) Add adjacent modes of directional modes to the candidate list;
   b) Split each directional mode in candidate list into different candidates corresponding to different transform sizes allowed;
   c) Calculate SAD costs between original and predicted blocks for all the candidates;
   d) Add a corresponding transform unit split cost to SAD whenever a smaller transform block is used;
   e) Select candidates with SAD costs less than minSAD+SADTolerance as new candidates.

Step 2:
If there is more than one candidate, evaluate the following for each candidate:
   a) Set a modeCost to be SATD between the predicted and original blocks;
   b) Add a corresponding transform unit split cost to modeCost when a smaller transform block is used;
   c) If there is no similar direction in the neighbors of current block, add modeCost to current cost;
   d) Select candidates with modeCost less than minCost+costTolerance as new candidates.

Step 3:
   a) Compare current cost with the cost of same block with smaller partitions (adding a prediction unit split cost);
   b) If one cost is smaller from the other by at least a partition_threshold, only enable the corresponding partition; otherwise enable both the partition and the full block size;
   c) Current cost is updated to be the smaller one, if one cost is smaller in b);

Step 4:
   a) If the minimum cost of all candidates exceeds the edge strength from preprocessing by an MPM_threshold, enable MPM;
   b) If there are more than one candidate left (including MPM if enabled in preprocessing and/or this step), generate the screened intra-prediction candidate data 312 to include the full candidate list;
   c) Else, output the only candidate as the final intra-prediction data 325.

Note that each of the constants and thresholds above can vary based on the value of QP in use in the encoder/decoder 102. The candidate screening preprocessor 310 can include a look-up table, state-machine or other device or algorithm that selects the values of each of the constants thresholds above based on the current value of QP.

In accordance with this example, the final intra-prediction processor 320 performs rate distortion optimization (RDO) or other final intra-prediction based on the final prediction unit/transform unit partition and mode decision indicated by the screened intra-prediction data 312 using constructed pixels. RDO costs of screened mode and partition candidates are first calculated. If MPM is enabled in preprocessing by intra-prediction preprocessor 300 or by screening performed by candidate screening preprocessor 310, RDO costs of MPM modes are also calculated. In general, the final intra-prediction processor 320 generates the final intra-prediction data 325 by selecting the candidate with the minimum RDO cost. The final intra-prediction processor 320 can optionally, however, evaluate adjacent blocks to determine if blocks with same mode can be merged to larger partitions.

FIG. 9 presents a flowchart representation of a method in accordance with an embodiment of the present disclosure. In particular, a method is presented for use in conjunction with a video processing device having one or more of the features and functions described in association with FIGS. 1-8. Step 340 includes generating edge angle range and edge strength data. Step 342 includes generating partition candidates based on the edge angle range and edge strength data. Step 344 includes generating mode candidates based on the edge angle range and edge strength data.

FIG. 10 presents a flowchart representation of a method in accordance with an embodiment of the present disclosure. In particular, a method is presented for use in conjunction with a video processing device having one or more of the features and functions described in association with FIGS. 1-9. Step 350 includes performing a first cost screening. Step 352 includes performing a second cost screening. Step 354 includes determining if final intra-prediction processing can be skipped.

FIG. 11 presents a flowchart representation of a method in accordance with an embodiment of the present disclosure. In particular, a method is presented for use in conjunction with a video processing device having one or more of the features and functions described in association with FIGS. 1-10. Step 400 includes processing pixel data from blocks of picture data to determine edge strength data and edge angle range data corresponding to a plurality of pixels of the blocks. Step 402 includes generating intra-prediction candidate data based on the edge strength data and the edge angle range data, wherein the intra-prediction candidate data indicates a first subset selected from a plurality of intra-prediction partitions and a second subset selected from a plurality of intra-prediction modes. Step 404 includes determining final intra-prediction data, based on the intra-prediction candidate data.

Step 402 can include selecting the first subset based on an accumulation of edge strength data for each pixel having a common one of a plurality of possible edge angle range values. Step 402 can include determining, for a selected one of the plurality of prediction block sizes, an edge angle range value of the plurality of edge angle range values having a second highest accumulation of edge strength data; comparing the second highest accumulation of edge strength data to a threshold; and excluding a partitioning of the selected one of the plurality of block sizes from the first subset when the second highest accumulation of edge strength data compares favorably to a threshold.

Step 402 can include determining, for a selected one of the plurality of prediction block sizes and for each partitioned subblock of the selected one of the plurality of prediction block sizes, an edge angle range value of the plurality of edge angle range values having a highest accumulation of edge strength data; comparing the highest accumulation of edge strength data for the selected one of the plurality of block sizes to the sum of the highest accumulation of edge strength data for each partitioned subblock; and includes a partitioning of the selected one of the plurality of block sizes in the first subset when the highest accumulation of edge strength data for the selected one of the plurality of block sizes compares unfavorably to the sum of the highest accumulation of edge strength data for each partitioned subblock.

Step 402 can include selecting the second subset based on an accumulation of edge strength data for each pixel having a common one of a plurality of possible edge angle range values. Step 402 can include including one of the plurality of modes corresponding to a particular edge angle range value in the second subset when the accumulation of edge strength data for the particular edge angle range value compares favorably to a threshold. Step 402 can include excluding one of the plurality of modes corresponding to a particular edge angle range value from the second subset when the accumulation of edge strength data for the particular edge angle range value compares unfavorably to a highest accumulation of edge strength data.

FIG. 12 presents a flowchart representation of a method in accordance with an embodiment of the present disclosure. In particular, a method is presented for use in conjunction with a video processing device having one or more of the features and functions described in association with FIGS. 1-11. Step 410 includes processing blocks of picture data based on intra-prediction candidate data corresponding to a plurality of pixels of the blocks, wherein the intra-prediction candidate data indicates a first subset selected from a plurality of intra-prediction partitions and a second subset selected from a plurality of intra-prediction modes, wherein the processing includes screening the intra-prediction candidate data to generate screened intra-prediction candidate data that indicates a third subset selected from a plurality of intra-prediction partitions and a fourth subset selected from a plurality of intra-prediction modes. Step 412 includes determining final intra-prediction data, based on an evaluation of the screened intra-prediction candidate data via rate distortion optimization.

The screening can be based on a first cost function and a second cost function. The first cost function and the second cost function can be non-rate-distortion based costs. The first cost function can be based on a sum of absolute differences and the second cost function can be based on a sum of absolute transformed differences.

In an embodiment, generating the screened intra-prediction candidate data can be based on at least one allowed transform size. Generating the fourth subset can include evaluating modes with directions adjacent to the second subset. Step 412 can be bypassed when the screened intra-prediction data indicates a single candidate.

Figure 13:
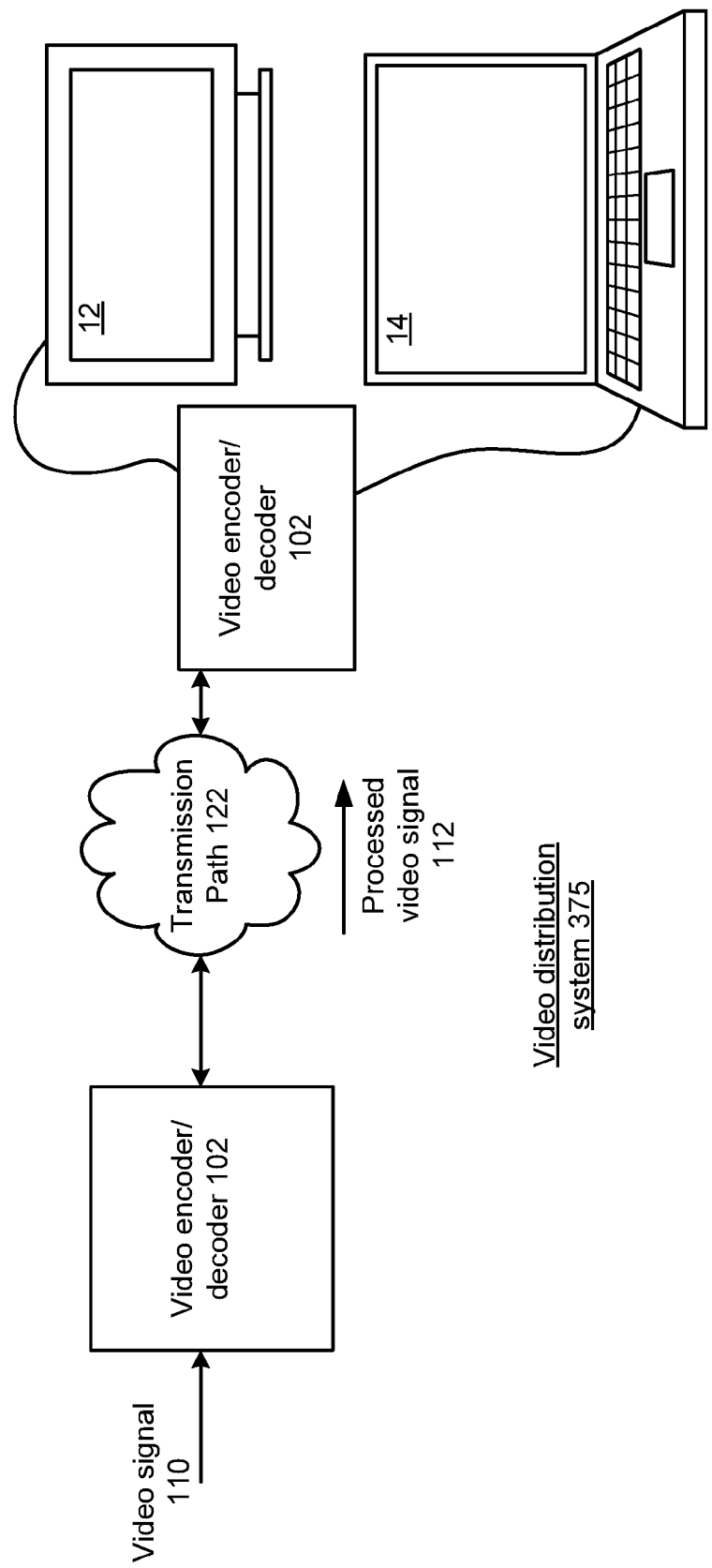
FIG. 13 presents a block diagram representation of a video distribution system 375 in accordance with an embodiment of the present disclosure.

FIG. 13 presents a block diagram representation of a video distribution system 375 in accordance with an embodiment of the present disclosure. In particular, processed video signal 112 is transmitted from a first video encoder/decoder 102 via a transmission path 122 to a second video encoder/decoder 102 that operates as a decoder. The second video encoder/decoder 102 operates to decode the processed video signal 112 for display on a display device such as television 12, computer 14 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 14:
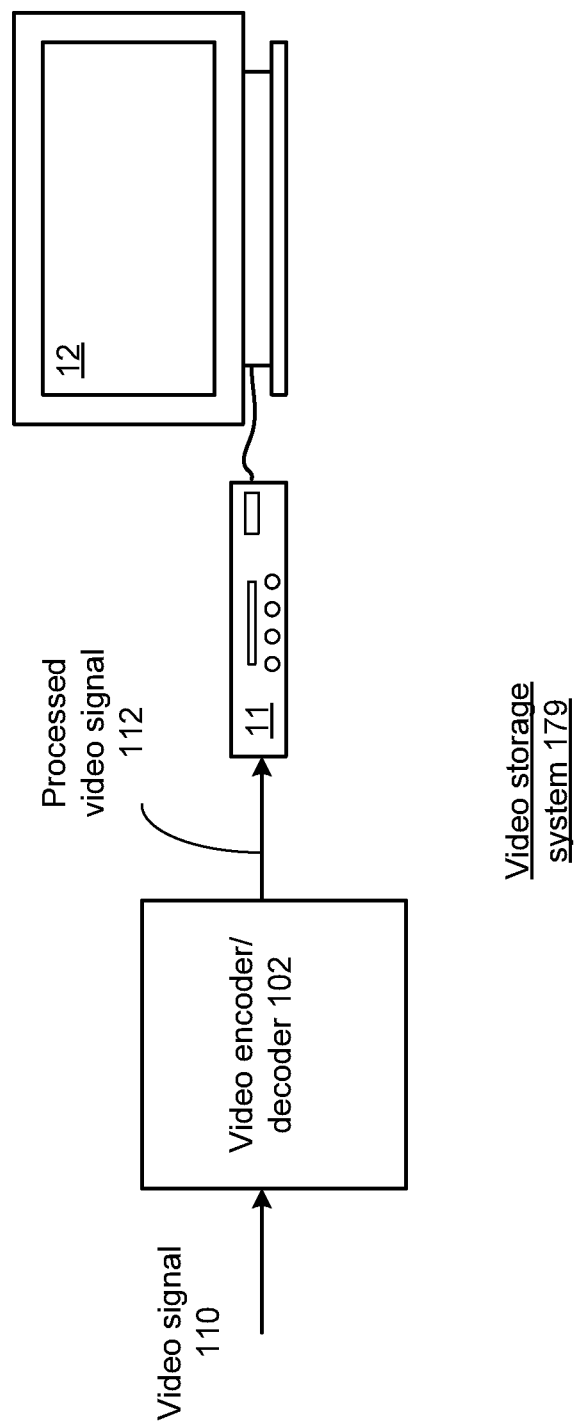
FIG. 14 presents a block diagram representation of a video storage system 179 in accordance with an embodiment of the present disclosure.

FIG. 14 presents a block diagram representation of a video storage system 179 in accordance with an embodiment of the present disclosure. In particular, device 11 is a set top box with built-in digital video recorder functionality, a stand alone digital video recorder, a DVD recorder/player or other device that stores the processed video signal 112 for display on video display device such as television 12. While video encoder/decoder 102 is shown as a separate device, it can further be incorporated into device 11. In this configuration, video encoder/decoder 102 can further operate to decode the processed video signal 112 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present disclosure as described herein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "preprocessor", "processor", and/or "processing unit" may be a single processing device, a shared processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An intra-prediction module for use in a video encoder that encodes a video signal including picture data, the intra-prediction module comprising:
   a candidate screening preprocessor configured to process blocks of the picture data based on intra-prediction candidate data, the blocks of the picture data corresponding to a plurality of pixels of the blocks, wherein the intra-prediction candidate data indicates a first subset selected from a plurality of intra-prediction partitions and a second subset selected from a plurality of intra-prediction modes generated from edge strength data and edge angle range data corresponding the plurality of pixels the blocks, wherein the processing of the blocks of the picture data includes screening the intra-prediction candidate data to generate screened intra-prediction candidate data that indicates a third subset selected from the plurality of intra-prediction partitions and a fourth subset selected from the plurality of intra-prediction modes; and
   a final intra-prediction processor, coupled to the candidate screening preprocessor, that determines final intra-prediction data, based on rate-distortion based costs of the screened intra-prediction candidate data.

2. The intra-prediction module of claim 1 wherein the candidate screening preprocessor generates the screened intra-prediction candidate data based on a first cost function and a second cost function.

3. The intra-prediction module of claim 2 wherein the first cost function and the second cost function are non-rate-distortion based costs.

4. The intra-prediction module of claim 2 wherein the first cost function is based on a sum of absolute differences and the second cost function is based on a sum of absolute transformed differences.

5. The intra-prediction module of claim 1 wherein the candidate screening preprocessor generates the screened intra-prediction candidate data based on at least one allowed transform size.

6. The intra-prediction module of claim 1 wherein the candidate screening preprocessor generates the fourth subset by evaluating modes with directions adjacent to the second subset.

7. The intra-prediction module of claim 1 wherein the final intra-prediction processor is bypassed when the screened intra-prediction candidate data indicates a single candidate.

8. The intra-prediction module of claim 1 wherein the candidate screening preprocessor selectively enables and disables a most probable mode indicator.

9. The intra-prediction module of claim 1 wherein the candidate screening preprocessor generates the screened intra-prediction candidate data based on a value of a quantization parameter.

10. A method for use in a video encoder that encodes a video signal including picture data, the method comprising:
processing blocks of the picture data based on intra-prediction candidate data, corresponding to a plurality of pixels of the blocks of the picture data, wherein the intra-prediction candidate data indicates a first subset selected from a plurality of intra-prediction partitions and a second subset selected from a plurality of intra-prediction modes generated from edge strength data and edge angle range data corresponding the plurality of pixels the blocks, wherein the processing includes screening the intra-prediction candidate data to generate screened intra-prediction candidate data that indicates a third subset selected from the plurality of intra-prediction partitions and a fourth subset selected from the plurality of intra-prediction modes; and
determining final intra-prediction data, based on an evaluation of the screened intra-prediction candidate data via rate distortion optimization.

11. The method of claim 10 wherein generating the screened intra-prediction candidate data is based on a first cost function and a second cost function.

12. The method of claim 11 wherein the first cost function and the second cost function are non-rate-distortion based costs.

13. The method of claim 11 wherein the first cost function is based on a sum of absolute differences and the second cost function is based on a sum of absolute transformed differences.

14. The method of claim 10 wherein generating the screened intra-prediction candidate data is based on at least one allowed transform size.

15. The method of claim 10 wherein generating the fourth subset includes evaluating modes with directions adjacent to the second subset.

16. The method of claim 10 wherein determining the final intra-prediction data is bypassed when the screened intra-prediction data indicates a single candidate.

* * * * *